(No Model.)
C. E. ROBERTS.
ROD SUPPORT FOR SCREW OR OTHER MACHINES.
No. 526,790. Patented Oct. 2, 1894.
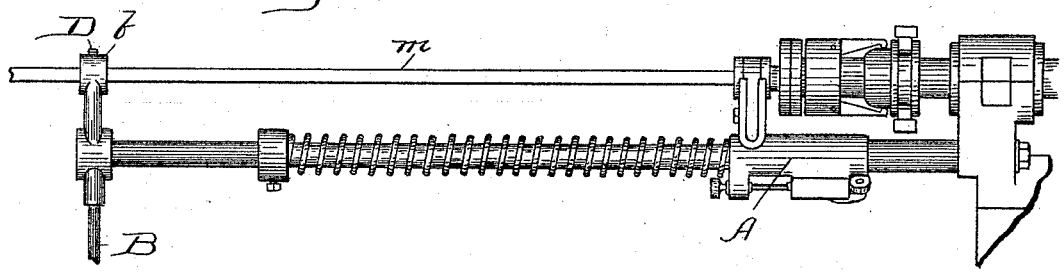
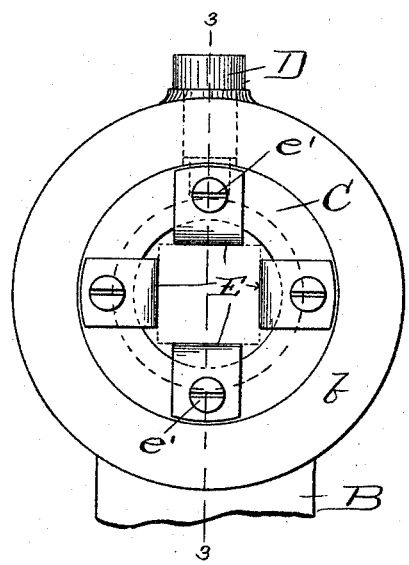
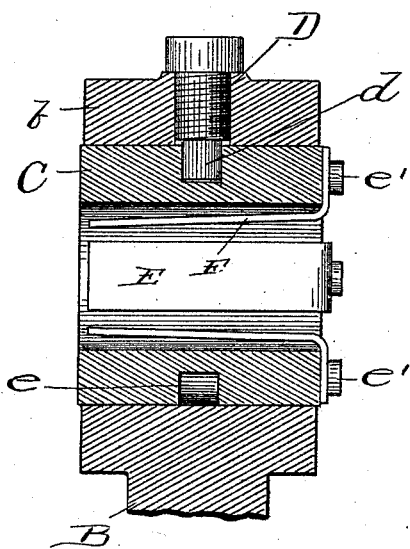
Witnesses:
Sow. E. Curtis
A. W. Munday.
Inventor:
Charles E. Roberts
By Munday, Evarts & Adcock.
His Attorneys.

UNITED STATES PATENT OFFICE.

CHARLES E. ROBERTS, OF OAK PARK, ILLINOIS.

ROD-SUPPORT FOR SCREW OR OTHER MACHINES.

SPECIFICATION forming part of Letters Patent No. 526,790, dated October 2, 1894.

Application filed January 12, 1894. Serial No. 496,610. (No model.)

*To all whom it may concern:*

Be it known that I, CHARLES E. ROBERTS, a citizen of the United States, residing in Oak Park, in the county of Cook and State of Illinois, have invented a new and useful Improvement in Rod-Supports for Screw or other Machines, of which the following is a specification.

This invention relates to improvements in the support employed in screw-cutting machines for sustaining the outer end of the rod from which the screws are cut. Prior to my invention there have been used for this purpose, open forks, in the crotch of which the rods may rest, and also bushings having an eye opening through which the rod may be passed, the bushing being mounted in a suitable standard and the opening in it conforming more or less closely to the shape of the rod. In both these forms the rod is free to move laterally relative to its axis, because the fork is not adapted to prevent such movement, while the bushing, even if it conforms to the size of the rod when new, soon becomes worn so as to give lateral freedom. The bushing also must be sufficiently large so as not to interfere with the longitudinal sliding of the bar through it, and if made loose enough to prevent friction in this respect and allow for variations in size of the rods, there will naturally be opportunity for the lateral play. In operation the rod is in a continuous state of vibration at its free end, and where it has any freedom in its support a rattling noise is caused by that vibration which is so loud and continuous as to be very annoying to the workmen. To prevent this noise and also to add to the life of service of the bushing is my object in the present invention, in which I employ a rotating bushing mounted in a suitable support, and provided with springs adapted to bear upon the sides of the rod with sufficient force to prevent the lateral looseness or play, and yet allow the rod to move longitudinally and without unnecessary friction. The springs when thus used yield to any irregularities upon the surface of the rod, and they also take up automatically the wear upon them caused by the rod. They may also be quickly and easily replaced when worn out, and they serve to wholly prevent the objectionable noise referred to.

In the drawings, Figure 1 is a front elevation of a portion of a screw cutting machine to which my support has been applied. Fig. 2 is a side elevation of the bushing and its holder, enlarged, and Fig. 3 is a section upon the line 3—3 of Fig. 2.

In the drawings A may represent the feeding devices of a screw cutting machine, which, however, I do not describe in detail, inasmuch as the invention is applicable to any screw cutting machine.

*m* is the rod being operated upon in the machine.

B is a standard provided with a holding eye or ring *b* at its upper end. In this ring I place the rotatable bushing C, and confine it therein by any suitable means, as for instance the set screw D, having a point *d* adapted to enter the annular groove *e* formed in the outer periphery of the bushing.

E E are a series of springs secured to the bushing and bearing at their free ends against the sides of the rod *m*. These springs may be made of flat metal and bent and secured to the side face of the bushing by screws *e'*, but I do not wish to be limited to this kind of spring or to the manner of fastening them, as the construction may be greatly varied in both respects, nor do I wish to be limited to any particular number of springs. They hold the rod with sufficient firmness to prevent any lateral play by it within the bushing, and thus wholly prevent the rattling noise.

I prefer that the bushing be made rotatable, because in that way it is adapted to be used with rods of any shape, and there is no wearing friction upon the springs, except such as is caused by the longitudinal movement of the rod.

I claim—

The combination with a machine manufacturing screws or other articles from rods, of a support for the outer end of the rods, said support being provided with a bushing through which the rod passes adapted to turn freely with the rod in the latter's axial rotation, and with springs secured to the bushing and bearing upon the sides of the rod so as to prevent lateral play by it, substantially as specified.

CHARLES E. ROBERTS.

Witnesses:
EDW. S. EVARTS,
H. M. MUNDAY.